US008231266B2

(12) United States Patent
Schulze

(10) Patent No.: US 8,231,266 B2
(45) Date of Patent: Jul. 31, 2012

(54) APPARATUS FOR MEASURING TEMPERATURE

(75) Inventor: Stefan Schulze, Weil Am Rhein (DE)

(73) Assignee: Endress + Hauser Wetzer GmbH + Co. KG, Obere Wank 1, Nesselwang (DE)

( * ) Notice: Subject to any disclaimer, the term of this patent is extended or adjusted under 35 U.S.C. 154(b) by 830 days.

(21) Appl. No.: 11/990,603

(22) PCT Filed: Jul. 13, 2006

(86) PCT No.: PCT/EP2006/064214
§ 371 (c)(1),
(2), (4) Date: Feb. 23, 2009

(87) PCT Pub. No.: WO2007/020140
PCT Pub. Date: Feb. 22, 2007

(65) Prior Publication Data
US 2009/0201968 A1    Aug. 13, 2009

(30) Foreign Application Priority Data
Aug. 18, 2005  (DE) .................... 10 2005 039 439

(51) Int. Cl.
*G01K 15/00* (2006.01)
*G01K 13/00* (2006.01)
*G01K 1/00* (2006.01)
(52) U.S. Cl. .............. 374/1; 374/148; 374/208
(58) Field of Classification Search ............... 374/1, 148, 374/208
See application file for complete search history.

(56) References Cited

U.S. PATENT DOCUMENTS

| | | | | |
|---|---|---|---|---|
| 2,162,614 A * | 6/1939 | Fry et al. ................. | 374/1 |
| 2,299,867 A * | 10/1942 | Wolfson .................. | 374/3 |
| 3,350,915 A * | 11/1967 | Staffin ..................... | 374/3 |
| 4,050,289 A * | 9/1977 | Fairbairn et al. .......... | 374/3 |
| 5,713,668 A | 2/1998 | Lunghofer | |
| 6,193,411 B1 * | 2/2001 | Chen ...................... | 374/2 |
| 6,473,708 B1 | 10/2002 | Watkins | |
| 6,663,277 B1 * | 12/2003 | Sandmæl ................. | 374/3 |
| 6,908,224 B2 * | 6/2005 | Schneider et al. ........ | 374/1 |
| 2002/0034210 A1 * | 3/2002 | Plotnikov et al. ......... | 374/10 |
| 2006/0045164 A1 * | 3/2006 | Schuh et al. ............. | 374/1 |
| 2006/0088077 A1 * | 4/2006 | Jussel et al. ............. | 374/141 |

FOREIGN PATENT DOCUMENTS

| | | |
|---|---|---|
| DE | 31 00 273 A1 | 8/1982 |
| DE | 31 45 333 A1 | 5/1983 |
| DE | 35 21 203 A1 | 12/1986 |
| DE | 298 23 855 U1 | 2/2000 |
| FR | 2 846 743 | 5/2004 |

\* cited by examiner

*Primary Examiner* — Lisa Caputo
*Assistant Examiner* — Mirellys Jagan
(74) *Attorney, Agent, or Firm* — Bacon & Thomas, PLLC

(57) ABSTRACT

An apparatus for ascertaining and/or monitoring at least one temperature. The apparatus includes, according to a first variable, at least one temperature sensor, at least one reference temperature sensor and at least one heating/cooling unit, which is thermally coupled with the temperature sensor and with the reference temperature sensor. According to a second variant, the invention includes that at least one reference temperature sensor and the temperature sensor and the reference temperature sensor are embodied and placed in such a manner that they measure essentially the same temperature. At least one head transmitter is provided, which connects the temperature sensor and the reference temperature sensor with the head transmitter in such a manner that the head transmitter receives the data measured by the temperature sensor and the reference temperature sensor. At least one memory unit is provided, in which the measured data of the temperature sensor and the reference temperature sensor are storable.

5 Claims, 1 Drawing Sheet

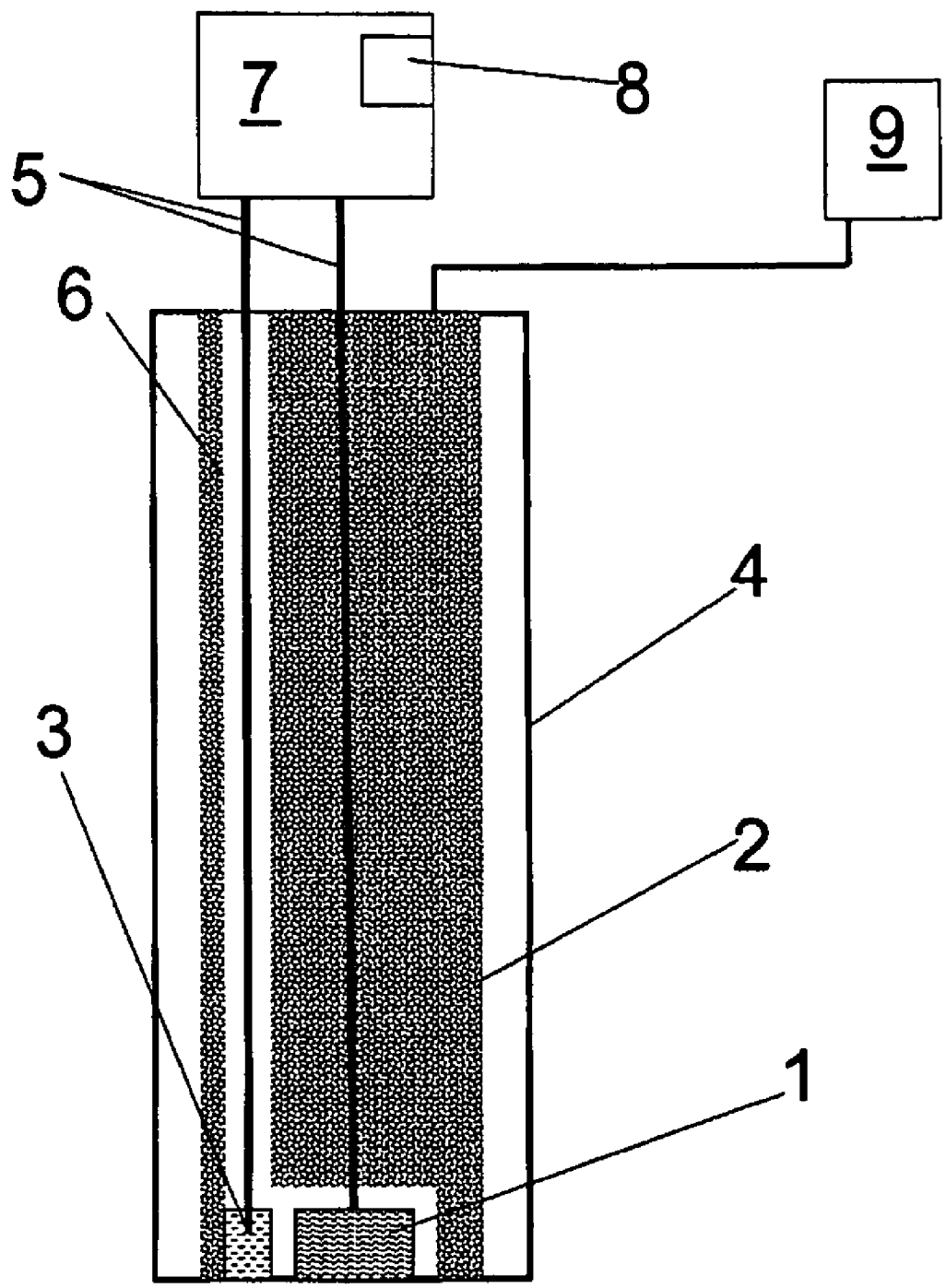

APPARATUS FOR MEASURING TEMPERATURE

TECHNICAL FIELD

The invention relates to an apparatus for ascertaining and/or monitoring at least one temperature. The apparatus includes at least one temperature sensor. The temperature can be, for example, that of a medium, such as e.g. a liquid, a bulk good, or a gas. The medium is located in a container or in a tube or pipe.

BACKGROUND DISCUSSION

Temperature sensors, or thermometers, are known in the state of the art. A problem is that these sensors must, over the course of their use, be calibrated after certain intervals of time, as a function of the particular application, in which they are used. Calibration is difficult to accomplish, since the temperature sensor is normally installed in a plant, e.g. on a tank or pipe, and must, therefore, be deinstalled for the calibration. This implies, in most cases, that a process being performed must be interrupted. Thus, medium must be drained out of a container, or medium is not permitted to flow through a pipe. Furthermore, as a part of the deinstallation, existing seals are broken and must then be made effective again in conjunction with the reinstallation.

SUMMARY OF THE INVENTION

In view thereof, an object of the invention is to provide a measuring device for measuring and/or monitoring temperature, which measuring device can be calibrated as simply as possible, even in the installed state, i.e. without interrupting the process.

The object is achieved by the invention in two variants. Common to both is the presence of a reference temperature sensor.

In a first variant, the measuring apparatus is embodied in such a way that at least one reference temperature sensor is provided, along with at least one heating/cooling unit. The heating/cooling unit is thermally coupled with the temperature sensor and with the reference temperature sensor. The invention resides in the fact that specific temperatures can be achieved via the heating/cooling unit; that is, corresponding temperatures act on the temperature sensor and on the reference temperature sensor. Thus, in a calibration phase, the respectively resulting measured temperature values can be compared and used for a calibration of the temperature sensor. The temperature sensor is, for example, a temperature-dependent resistance element, such as e.g. a Pt100. Because of the presence of the heating/cooling unit, it is no longer necessary to deinstall the temperature sensor. In turn, the reference temperature sensor allows the calibration by ascertaining the effective temperature resulting from the interplay of the heating/cooling unit and the temperature of the process or medium.

An embodiment of the apparatus of the first variant provides that the reference temperature sensor can be calibrated for at least one temperature value and/or a temperature range. Depending on the required type of calibration, the reference temperature sensor can be calibrated for two, three, four, or any number of temperatures, or it can be continuously calibrated for a plurality of temperature ranges, or calibrated for the calibration of the temperature sensor. The reference temperature sensor is especially embodied and placed in such a way that it can be calibrated independently of the temperature sensor. This embodiment allows a reliable reference temperature sensor to be used for the calibration of temperature sensor. In an embodiment, the reference temperature sensor is especially adapted such that it can be officially verified.

An embodiment of the apparatus of the first variant includes that at least one control unit is provided, which controls the heating/cooling unit, at least as regards which temperature the heating/cooling unit generates. The control unit can thus be used in a calibration phase such that it specifies for the heating/cooling unit appropriate temperatures or temperature ranges, which the heating/cooling unit then generates.

In an embodiment of the apparatus of the first variant, at least one housing is provided, and at least the temperature sensor and the heating/cooling unit are arranged in the housing. The temperature sensor is usually located in a protective tube. This normally also serves for fixing the measuring apparatus in the application area. In this embodiment, the heating/cooling unit is likewise located in the housing, and is in thermal contact there with the temperature sensor, by surrounding it, for example, or by being mounted above it.

In an embodiment of the apparatus of the first variant, the reference temperature sensor is releasably arranged in the housing. In this way, the reference temperature sensor can be removed from the housing, and can be calibrated, for example, externally, by itself. This embodiment, especially, allows the calibration of the reference temperature sensor independently of the temperature sensor.

In an embodiment of the apparatus of the first variant, at least one head transmitter is provided, the temperature sensor and the reference temperature sensor are connected in such a way with the head transmitter that the head transmitter receives the measured data from the temperature sensor and the reference temperature sensor, and at least one memory unit is provided, in which the measured data of the temperature sensor and the reference temperature sensor can be stored. Such data recording is carried out either only during the calibration, or the reference temperature sensor remains in the housing and the temperature data are thus obtained redundantly, e.g. redundantly stored in the memory unit. This allows measurement characteristics to be evaluated later.

The method for calibration in accordance with the first variant can be summarized as follows. During a calibration phase, a heating/cooling unit generates certain adjustable temperatures. These temperatures are measured by the temperature sensor to be calibrated, and by a calibratable reference temperature sensor, especially one calibrated independently of the temperature sensor to be calibrated. The measurement of the reference temperature sensor serves for checking which temperature the heating/cooling unit effectively generates. This is especially important, because the temperature sensor to be calibrated remains in the installed condition, and because, therefore, the process- or measuring-environment has various temperatures, or, as the case may be, the process- or measuring-environment influences the heating/cooling output of the heating/cooling unit. From the comparison of the measured temperatures, the temperature sensor can then be calibrated. This is especially possible for a plurality of temperatures, or for entire temperature ranges.

The invention achieves the object with a second variant, which includes features that: At least one reference temperature sensor is present; the temperature sensor and the reference temperature sensor are embodied and arranged in such a way that they measure essentially the same temperature; at least one head transmitter is provided; the temperature sensor and the reference temperature sensor are connected with the head transmitter; the head transmitter receives the data measured by the temperature sensor and the reference temperature sensor; and at least one memory unit is provided, in which the measured data of the temperature sensor and the reference temperature sensor are storable. This second variant can provide, quasi, a continuous calibration. The temperatures are measured by the temperature sensor to be calibrated and by the reference temperature sensor. The measured data are stored. Deviations beyond a certain predetermined tolerance range can, in the case of this redundant measurement, be immediately displayed and alarmed. The data are recorded over a certain period of time or over the occurrence of a predetermined temperature range and can then be evaluated. Since, thus, the measuring behavior of the temperature sensor is recorded over a certain time, or over a certain temperature range, calibration data for the sensor can be ascertained therefrom. The reference temperature sensor can be calibrated therefor in certain intervals on its own and independently of the temperature sensor, in order to produce safe reference values. In this second variant, thus, in contrast to the first variant, certain temperatures are not brought about, but, instead, result from the process, or from the medium, whose temperatures are to be measured.

The commonality of the two variants thus resides in the features that a reference temperature sensor is present and that the measurement data of the temperature sensor and the reference temperature sensor are compared, at least at some temperatures, and are available for the calibration. In the first variant, these temperatures are produced with a heating/cooling unit, while, in contrast, in the second variant, they come from the process or medium itself.

An embodiment of the second variant provides that the reference temperature sensor is calibratable for at least one temperature value and/or one temperature range. In this way, reliable reference values are available for the calibration. The further explanations above regarding the reference temperature sensor of the first variant hold correspondingly also here in the case of the second variant.

Also associated with the second variant is an embodiment, in which the reference temperature sensor is embodied and placed in such a manner that it is calibratable independently of the temperature sensor. For the meaning of this embodiment, refer, likewise, to the remarks above in the case of the first variant.

An embodiment of the second variant includes that at least one housing is provided and that at least the temperature sensor and the reference temperature sensor are arranged in the housing. The housing protects, for example, against the medium or against moisture and prevents, also, mechanical loading of the temperature sensors.

An embodiment of the second variant provides that the reference temperature sensor is arranged releasably in the housing. This embodiment enables the at least temporary deinstallaation of the reference temperature sensor, in order that it can be calibrated on its own.

The method of calibration of the temperature sensor according to the second variant can, thus, be summarized as follows. The temperature e.g. of a medium is measured by the temperature sensor and by the reference temperature sensor. The measurement data are stored in a memory unit. The temperatures needed for the calibration result, thus, from the process, or medium, itself. After a predetermined period of time or after moving through a predetermined temperature range, the measurement data are compared with one another and applied for the calibration of the temperature sensor.

BRIEF DESCRIPTION OF THE DRAWING

The invention will now be explained in greater detail on the basis of the appended drawing, the sole FIGURE of which shows as follows:

FIG. 1 a schematic drawing of a measuring device of the invention.

DETAILED DISCUSSION

In FIG. 1, the temperature sensor 1 of the measuring device is accommodated in a housing 4, which is, in this case, a protective tube. In thermal contact with the temperature sensor 1 is a heating/cooling element 2, which is controlled by the control unit 9. The temperatures achieved in this way act also on a reference temperature sensor 3, which can be removed from the housing 4 via the passageway 6 and thus is calibrated on its own and independently of the temperature sensor 1 to be calibrated. Both the temperature sensor 1 and also the reference temperature sensor 3 are connected via electrical connections 5 with a head transmitter 7. The head transmitter receives the measurement data, e.g. the resistance values (when temperature-dependent, resistance elements are being used), and ascertains therefrom the measured temperatures. The measurement data are then stored in a memory unit 8. This arrangement with head transmitter 7 and memory unit 8 can be installed temporarily for the first variant or fixedly for the second variant. In the case of the second variant, then, especially, an activating of the heating/cooling unit 2 can be omitted, since the temperatures are reached by the medium, or by the process, itself.

In the calibration in the first variant, for example, the following steps occur. The calibrated reference temperature sensor 3 is introduced via the passageway 6 into the measuring device. The control unit 9 sets certain temperatures or temperature ranges to be moved through. These are produced by the heating/cooling unit 2. The measured data are here received by a head transmitter 7 and stored in a memory unit 8 (instead, two separate units can be used for this data handling). The measured data then for the basis for calibration of the temperature sensor 1.

In the second variant, the method is of the following character. Temperature sensor 1 and the reference temperature sensor 3 are both installed in the housing 4 and measure the occurring temperatures. These are here received by a head transmitter 7 and stored in the memory unit 8. Alternatively, each sensor can have its own transmitter and memory unit. After a certain amount of time, the measured data are read out, evaluated and applied for the calibration.

The invention claimed is:

1. An apparatus for ascertaining and/or monitoring the temperature of a medium in a container or in a tube or pipe, comprising:
   a housing;
   at least one temperature sensor;
   at least one reference temperature sensor; and
   at least one heating/cooling unit, which is thermally coupled with said at least one temperature sensor and with said at least one reference temperature sensor,
   wherein:
   said at least one temperature sensor and said at least one heating/cooling unit are arranged in said housing, which housing protects against the medium;
   in a calibration phase the measured temperature values from said at least one temperature sensor and said at least one reference temperature sensor resulting from corresponding temperatures that act on said at least one temperature sensor and said at least one reference temperature sensor are compared and used for a calibration of said at least one temperature sensor; and the corresponding temperatures are achieved by way of specific temperatures that can be achieved via the heating/cooling unit.

2. The apparatus as claimed in claim 1, wherein:
said at least one reference temperature sensor is calibratable for at least one temperature value and/or one temperature range.

3. The apparatus as claimed in claim 1, further comprising:
at least one control unit, which controls said at least one heating/cooling unit at least with respect to temperature which said at least one heating/cooling unit produces.

4. The apparatus as claimed in claim 1, wherein:
said at least one reference temperature sensor is arranged releasably in said housing.

5. The apparatus as claimed in claim 1, further comprising:
at least one head transmitter; and at least one memory unit, wherein:
said at least one temperature sensor and said at least one reference temperature sensor are connected with said at least one head transmitter in such a manner that said at least one head transmitter receives data measured by said at least one temperature sensor and by said at least one reference temperature sensor; and
the measured data of said at least one temperature sensor and said at least one reference temperature sensor are storable in said at least one memory unit.

* * * * *